US009173168B2

(12) United States Patent
Rodriguez et al.

(10) Patent No.: US 9,173,168 B2
(45) Date of Patent: Oct. 27, 2015

(54) APPARATUS AND METHOD FOR POWER SAVING IN AN AD HOC NETWORK (75) Inventors: Demóstenes Zegarra Rodriguez, Manaus Amazonas (BR); Renata Lopes Rosa, Sao Paulo (BR)

(73) Assignee: Nokia Technologies Oy, Espoo (FI)

( * ) Notice: Subject to any disclaimer, the term of this patent is extended or adjusted under 35 U.S.C. 154(b) by 197 days.

(21) Appl. No.: 13/818,668

(22) PCT Filed: Aug. 23, 2010

(86) PCT No.: PCT/IB2010/053792
§ 371 (c)(1),
(2), (4) Date: Feb. 23, 2013

(87) PCT Pub. No.: WO2012/025785
PCT Pub. Date: Mar. 1, 2012

(65) Prior Publication Data
US 2013/0201891 A1  Aug. 8, 2013

(51) Int. Cl.
*H04W 52/02* (2009.01)
*H04W 40/00* (2009.01)
*H04W 40/02* (2009.01)
*H04L 12/721* (2013.01)
*H04W 84/18* (2009.01)

(52) U.S. Cl.
CPC ........... *H04W 52/0235* (2013.01); *H04L 45/26* (2013.01); *H04W 40/005* (2013.01); *H04W 40/023* (2013.01); *H04W 52/0219* (2013.01); *H04W 84/18* (2013.01); *Y02B 60/50* (2013.01)

(58) Field of Classification Search
CPC .......... H04W 52/0235; H04W 40/005; H04W 40/02; H04W 40/023; H04W 84/18
See application file for complete search history.

(56) References Cited

U.S. PATENT DOCUMENTS

| 7,719,988 | B1 * | 5/2010 | Ruiz et al. ..................... 370/238 |
| 8,705,555 | B2 * | 4/2014 | Imai et al. ..................... 370/430 |
| 2004/0125776 | A1 * | 7/2004 | Haugli et al. ................. 370/338 |
| 2005/0063348 | A1 | 3/2005 | Donovan |
| 2005/0157697 | A1 | 7/2005 | Lee et al. |
| 2005/0198219 | A1 | 9/2005 | Banerjee et al. |
| 2006/0164213 | A1 * | 7/2006 | Burghard et al. ............ 340/10.2 |
| 2007/0165545 | A1 * | 7/2007 | Dobrowski et al. ........... 370/254 |
| 2007/0233835 | A1 | 10/2007 | Kushalnagar et al. |
| 2010/0146151 | A1 | 6/2010 | Jeong et al. |

OTHER PUBLICATIONS

International Search Report and Written Opinion for Application No. PCT/IB2010/053792; dated Apr. 14, 2011.
Supplementary European Search Report for Application No. EP 10 85 6347 dated Feb. 21, 2014.
Office Action from Chinese Patent Application No. 201080068759.3 dated Jan. 7, 2015.

* cited by examiner

*Primary Examiner* — Min Jung
(74) *Attorney, Agent, or Firm* — Alston & Bird LLP (57) ABSTRACT

An example apparatus, such as a quorum server of a quorum system, is caused to receive a route information message or duplication thereof from a node of an ad hoc network including a plurality of nodes, with the node having sent or received the route information message during implementation of a routing protocol to determine a route between the nodes, such as according to a gossip algorithm. The apparatus is caused to identify, based on the route information message, nodes intended to also receive the route information message or intended to be part of the determined route. And the apparatus is caused to prepare an instruction message for transmission to one or more of the nodes such that the identified one or more nodes enter or remain in an active mode, and nodes other than the identified one or more of the nodes enter or remain in a power-saving mode.

32 Claims, 7 Drawing Sheets

APPARATUS AND METHOD FOR POWER SAVING IN AN AD HOC NETWORK

TECHNICAL FIELD

Example embodiments of the present invention generally relate to ad hoc networks and, more particularly, relate to power saving in an ad-hoc network.

BACKGROUND

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of a few tens of meters to one hundred meters. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks are cost-effective and use low power wireless devices that have a typical range of about ten meters. One of the better-known examples of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of about 2 to 100 Mbps and have a longer range, which requires greater power consumption.

The development referred to above has also brought on the evolution of so-called ad-hoc networks, which offer unrestricted mobility without any underlying infrastructure. The nodes of an ad-hoc network may be mobile or wireless, with examples of such networks including the mobile ad-hoc network (MANET) and the smart sensor network (SSN). Unlike traditional wireless networks, ad-hoc networks need not necessarily rest on an underlying infrastructure, such as base stations. Instead, all the nodes of an ad-hoc network share the responsibility of network formation and management. In an ad-hoc network, each node therefore acts as a router transmitting data/messages to other nodes of the network, and intermediate ad-hoc nodes relay the data/messages between two nodes located far apart from each. Standalone ad-hoc networks are useful at least whenever it is impossible to use a fixed network infrastructure due to geographical, terrestrial, or time constraints, for example. Local ad-hoc networks can also be integrated into legacy networks, such as wireless networks.

BRIEF SUMMARY

In view of the foregoing background, one aspect of example embodiments of the present invention is directed to an apparatus including at least one processor and at least one memory including computer program code, where the apparatus of this aspect may include a quorum server of a plurality of quorum servers implementing a quorum system within the ad hoc network. The memory/memories and computer program code are configured to, with processor(s), cause the apparatus to at least perform a number of operations. The apparatus is caused to receive a route information message or duplication of the route information message from a node of an ad hoc network including a plurality of nodes, with the node having sent or received the route information message during implementation of a routing protocol to determine a route between the nodes. In a more particular example, the node may have sent or received the route information message during implementation of a routing protocol according to a gossip algorithm.

The apparatus is caused to identify, based on the route information message, one or more of the nodes intended to also receive the route information message or intended to be part of the determined route. And the apparatus is caused to prepare an instruction message for transmission to one or more of the nodes such that the identified one or more nodes enter or remain in an active mode, and the nodes other than the identified one or more of the nodes enter or remain in a power-saving mode. For example, the apparatus may be caused to prepare an instruction message to the identified one or more nodes to instruct the respective one or more nodes to enter or remain in an active mode.

The apparatus may be further caused to wait a period of time after preparing the instruction message to receive a second route information message. And in an instance in which the second route information message is not received within the period of time, the apparatus may be caused to prepare a second instruction message for transmission to the one or more of the nodes such that the identified one or more nodes remain in the active mode, and the nodes other than the identified one or more of the nodes remain in the power-saving mode.

The apparatus may be further caused to participate in an association of one or more of the nodes with the apparatus. In such instances, being configured to cause the apparatus to receive a route information message or duplication of the route information message may include being configured to cause the apparatus to receive a route information message or duplication of the route information message from an associated node. Similarly, being configured to cause the apparatus to identify one or more of the nodes may include being configured to cause the apparatus to identify one or more of the associated nodes. And being configured to cause the apparatus to prepare an instruction message for transmission may include being configured to cause the apparatus to prepare an instruction message for transmission to one or more of the associated nodes.

Another aspect of example embodiments of the present invention is directed to an apparatus including at least one processor and at least one memory including computer program code, where the apparatus of this aspect may include a node of an ad hoc network. The memory/memories and computer program code are configured to, with processor(s), cause the apparatus to at least perform a number of operations. The apparatus of this aspect is caused to enter the apparatus in a power-saving mode from an active mode, and receive an instruction message from a server, such as a quorum server of a plurality of quorum servers implementing a quorum system within the ad hoc network. In a manner similar to that described above, the server may have received a route information message or duplication of the route information message from a node having sent or received the route information message during implementation of a routing protocol to determine a route between the nodes, where the implementation may have been according to a gossip algorithm. The server may have also identified, based on the route information message, one or more of the nodes including the apparatus intended to also receive the route information message or intended to be part of the determined route; and the server may have sent the instruction message to the identified one or more of the nodes including the apparatus. Then, in response to receiving the instruction message, the apparatus may be caused to enter the apparatus in the active mode.

The memory/memories and computer program code may be further configured to, with the processor(s), cause the apparatus to further direct operation of the apparatus in the active mode, and wait a period of time to receive a route information message or data message, or receive direction to send a route information message or data message. In such instances, being configured to cause the apparatus to enter the apparatus in a power-saving mode may include being configured to cause the apparatus to enter the apparatus in a power-saving mode in an instance in which the route information message or data message, or direction to send the route information message or data message, is not received within the period of time.

Receiving an instruction message may include receiving an instruction message from a server having received a first route information message or duplication of the first route information message. In such instances, the memory/memories and computer program code may be further configured to, with the processor(s), cause the apparatus to further prepare a second route information message for transmission to one or more other nodes during implementation of the routing protocol, and prepare the second route information message or duplication of the second route information message for transmission to the server. In this regard, being configured to cause the apparatus to prepare the second route information message for transmission to the server may include being configured to cause the apparatus to generate a duplication of the second route information message, and prepare the duplication of the second route information message for transmission to the server. Preparing the second route information message or duplication for transmission to the server may enable the server to identify, based on the route information message, one or more of the nodes intended to also receive the second route information message or intended to be part of the determined route. And it may enable the server to send an instruction message to the identified one or more of the nodes to instruct the respective one or more nodes to enter or remain in the active mode.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. For instance, example embodiments of the present invention may be shown and described herein in the context of ad-hoc networks; but it should be understood that example embodiments of the present invention may be equally applied in other types of distributed networks, such as grid computing, pervasive computing, ubiquitous computing, peer-to-peer, cloud computing for Web service or the like.

The terms "data," "content," "information," and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

Figure 1:
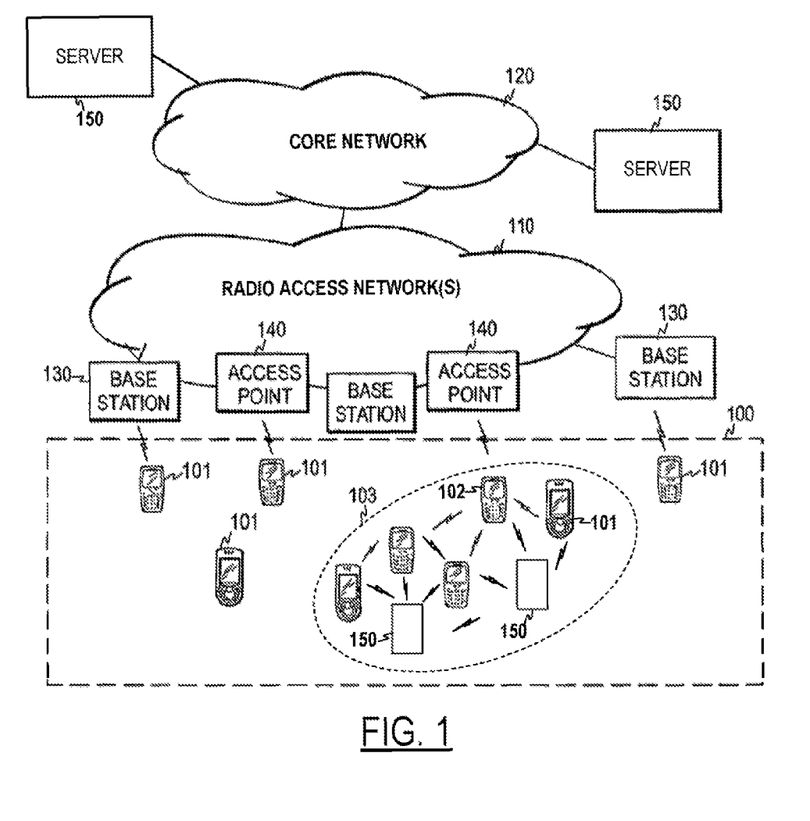
FIG. 1 illustrates a general communication environment according to example embodiments of the present invention.

FIG. 1 illustrates a general communication environment in which example embodiments of the present invention may be applied. The communication environment includes three interacting domains: a user equipment domain 100, an access domain including several radio access networks 110, and a backbone domain including a core network 120.

The above communication environment may include a mobile network and one or more short-range wireless networks, and may therefore include one or more base stations 130 (or node B elements), access points 140 or the like. Examples of these networks may include $3^{rd}$ Generation Partnership Project (3GPP) radio access networks, Universal Mobile Telephone System (UMTS) radio access UTRAN (Universal Terrestrial Radio Access Network), Global System for Mobile communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, $3^{rd}$ Generation (3G) or 3.9G (also referred to as UTRAN Long Term Evolution (LTE) or Super 3G) or E-UTRAN (Evolved UTRAN) networks. Generally, a radio access network may refer to any $2^{nd}$ Generation (2G), 3G, $4^{th}$ Generation (4G) or higher generation mobile communication network and their different versions, radio frequency (RF) or any of a number of different wireless networks, as well as to any other wireless radio access network that may be arranged to interwork with such networks.

The user equipment domain 100 may include a plurality of mobile terminals 101. In this context, the terminals may be multimode terminals. A multimode terminal here may refer to a terminal that has at least two operation modes, e.g., at least two radio interfaces based on different connectivity standards. Although one operation mode may be provided for communicating with the mobile network, the terminal may also be provided with one or more other operation modes, in which a short-range radio of the terminal may be active. The terminals may have different states with respect to each operation mode, and the states allowed concurrently depend on the implementation of the terminal.

The mobile terminals 101 may also form ad-hoc networks 103 in which the terminals (sometimes referred to herein as "nodes") may communicate directly or indirectly with each other, such as in accordance with various ones of the above manners by which the radio access networks may be configured to communicate. As explained herein, the ad-hoc network may be a mobile ad-hoc network (MANET), but it should be understood that any of a number of different types of ad hoc networks may employ example embodiments of the present invention. The ad-hoc networks may be connected to a radio access network 110 through one or more access points 140 of the access domain.

Each ad-hoc network 103 may include at least one trunk node 102 configured to communicate with a base station 130 or access point 140 of the radio access network, and configured to communicate with at least one other ad-hoc node for which the trunk node acts as an access point or gateway. The other nodes may be located at different distances from the trunk node, measured as the number of hops between the node and the trunk node. That is, the trunk node does not have to have a direct connection to each of the other nodes. In such instances, messages between the trunk node and an ad-hoc node may be further than one hop apart from the trunk node and may be relayed by one or more intermediate ad-hoc nodes. Therefore, inside a sub-network served by a trunk node, a connection may involve the end nodes and one or more intermediate nodes. The ad-hoc nodes may also form different sub-networks. The trunk node may also serve more than one ad-hoc network, and with different radio interfaces.

In addition to mobile terminals, an ad-hoc network may also include one or more wireless routers, which may assume the responsibilities of a trunk node. The wireless routers may also be located in the access domain, in which case the ad-hoc networks may penetrate into the access domain.

Each local ad-hoc network may thus be connected to an overlaying network infrastructure comprising at least one radio access network 110 and a core network 120. The radio access network and/or the core network may further be connected to one or more external networks, such as the Internet. The core network, external network and/or ad-hoc network 103 may include one or more service providers, servers 150 or the like. As used herein, the server(s) within an ad-hoc network may at times be referred to as super-node(s).

Figure 2:
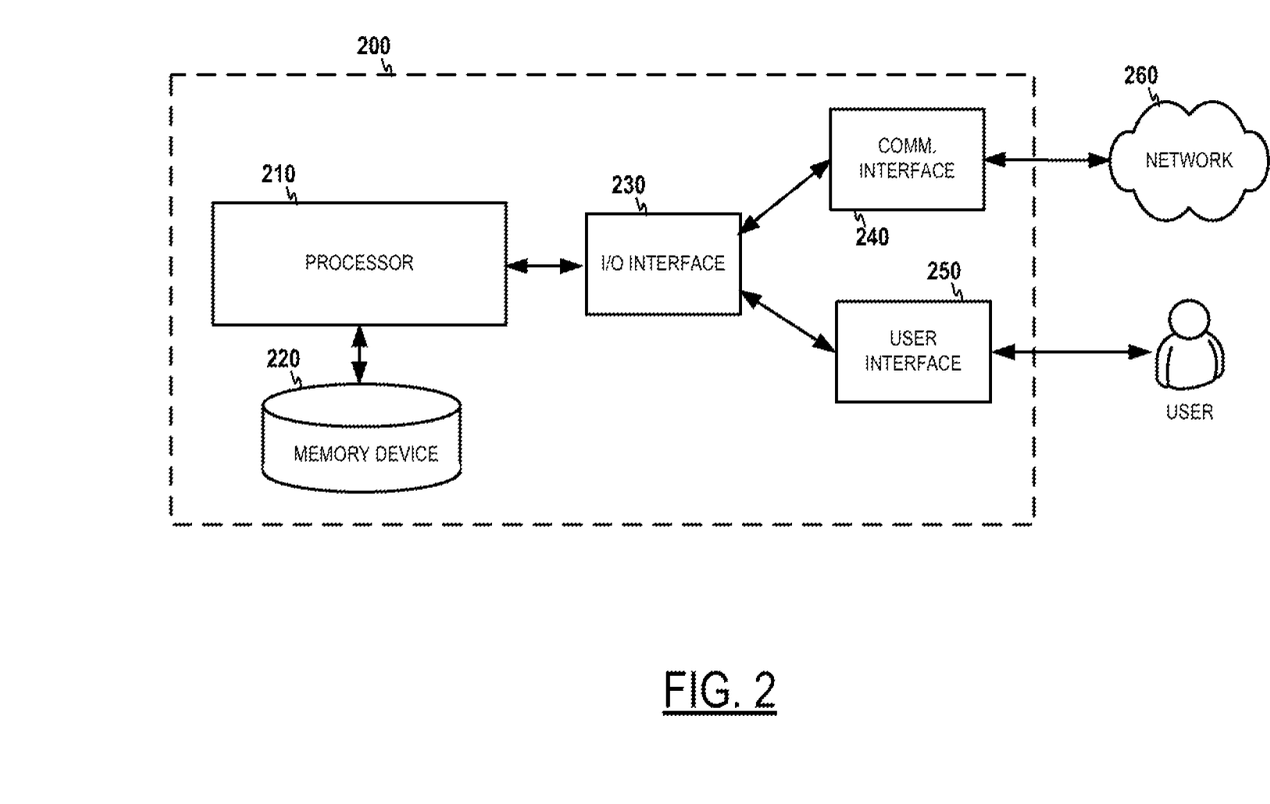
FIG. 2 illustrates an apparatus that may be configured to operate within the communication environment of FIG. 1, according to various example embodiments of the present invention.

Reference is now made to FIG. 2, which illustrates an apparatus 200 according to example embodiments of the present invention configured to perform the various functionalities described herein. As shown and described herein, the example apparatus may be configured to function as or otherwise implement one or more of the network components depicted in FIG. 1 (e.g., mobile terminal 101, base station 130, access point 140, service provider 150, etc.). The example apparatus depicted in FIG. 2 may also be configured to perform example methods of the present invention.

In some example embodiments, the apparatus 200 may, be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 210, memory devices 220, Input/Output (I/O) interfaces 230, communications interfaces 240 and/or user interfaces 250 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 210 may be an entity capable of performing operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 220 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 210.

Further, the memory device 220 may be configured to store information, data, applications, computer-readable program code instructions, and/or the like for enabling the processor 210 and the example apparatus 200 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 230 may be any device, circuitry, or means embodied in hardware, software or a combination of hardware and software that is configured to interface the processor 210 with other circuitry or devices, such as the communications interface 240 and/or the user interface 250. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 200 to perform, various functionalities of an example embodiment of the present invention.

The communication interface 240 may be any device or means embodied in hardware, software or a combination of hardware and software that is configured to receive and/or transmit data from/to one or more networks 260 (e.g., radio access networks 110, core networks 120, etc.) and/or any other device or module (e.g., other similar apparatuses such as to form an ad-hoc network 103) in communication with the example apparatus 200. The processor 210 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 240 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, RF, IrDA or any of a number of different wireless networking techniques. The communications interface may also be configured to support communications at the network layer, possibly via Internet Protocol (IP).

The user interface 250 may be in communication with the processor 210 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 220). In some example embodiments, the user interface circuitry is configured to facilitate user control of at least some functions of the apparatus 200 through the use of a display and configured to respond to user inputs. The processor may also comprise, or be in communication with, display circuitry configured to display at least a portion of a user interface, the display and the display circuitry configured to facilitate user control of at least some functions of the apparatus.

The nodes and other components of the ad-hoc network 103 of example embodiments of the present invention may implement any one or more of a number of different ad-hoc network routing protocols that control how the nodes decide to route data between the nodes in the network. A number of routing protocols may be categorized into proactive (table-driven) protocols, reactive (on-demand) and hybrid protocols. In proactive routing protocols, each node keeps up-to-date information about the network topology (the paths between the nodes) by the frequent exchange of routing information, which may be distributed by means of flooding throughout the network. In reactive routing protocols, the nodes may not periodically exchange routing information, but instead determine a path or route as necessary, by means of a route discovery process between nodes. And hybrid protocols often implement a combination of proactive and reactive protocols.

Example embodiments of the present invention will be described with respect to the ad hoc on-demand distance vector (AODV), which may be categorized as a reactive protocol. Examples of other suitable routing protocols include proactive protocols such as destination-sequenced distance vector (DSDV), optimized link state routing (OLSR), wireless routing protocol (WRP), cluster gateway switch routing (CGSR) and fisheye state routing (FSR); reactive protocols such as dynamic source routing (DSR), temporally ordered routing algorithm (TORA), associativity-based routing (ABR) and signal stability-based adaptive routing protocol (SSA); and hybrid protocols such as zone routing protocol (ZRP).

In accordance with AODV, at the time a source node of the ad-hoc network 103 needs a route to another, destination node, the source node may broadcast a route request (RREQ) message to its neighboring nodes. The neighboring nodes receive the RREQ message, record the node from which they received the message, and forward the message on to their respective neighboring nodes. The process continues until a node receiving the RREQ message knows a route to the destination node or is the destination node. The respective node then sends a route reply (RREP) message back through the route of nodes by which the respective node received the RREQ message from the source node, the source node thereby acquiring a route to the destination node. The source node may receive one or more RREP messages, and in instances in which the source node receives multiple RREP messages, the source node may select and begin using the route having the fewest number of hops between the source node and destination node.

Notably, a number of ad-hoc networks 103 have a dynamic topology whereby many of their nodes are free to arbitrarily move—resulting in frequent changes in network topology in which nodes have unidirectional or bidirectional links between one another. Also notably, a number of the nodes of ad-hoc networks may have a limited power capacity, and may from time-to-time require replacement or recharging of their power sources. This often places focus on energy conservation of such nodes. Further, the greater the communication between nodes, the more power the respective nodes consume. And the greater the movement of nodes in an ad-hoc network, the nodes may experience an increase in the likelihood of packet loss and/or a decrease in data flow. Example embodiments of the present invention therefore provide an apparatus and method of effectuating an ad-hoc network 103 that combines (1) a gossip algorithm to reduce broadcasting of unnecessary route information and the increased power usage that may result; (2) a quorum system to reduce packet loss and the decrease in data flow that may result; and (3) an power-saving algorithm to even further reduce the nodes' power usage.

Gossip Algorithm

The ad-hoc network 103 of example embodiments of the present invention may also implement a gossip algorithm to reduce the broadcasting of route information. The gossip algorithm may be considered a probabilistic multicast protocol in which a node forwards information only to a given number of neighbor nodes that is established by means of a probability setup in the algorithm. In other words, nodes implementing a gossip algorithm decide whether or not to forward a message (e.g., RREQ message) based on some probability. In this way, network flooding may be avoided, unless the probability is set to 1, meaning that 100% of the neighbors receive messages. Each node may only maintain a partial view of the entire system that is employed to guide the selection of nodes that will participate in the information exchange. As the nodes sending messages may randomly choose to whom they send the respective messages, the gossip algorithm may be fault tolerant and/or distributed.

The ad-hoc network 103 may implement any of a number of different types of gossip algorithms, including algorithms known as GOSSIP1 (p, k), GOSSIP2 ($p_1$, k, $p_2$, n) and GOSSIP3 (p, k, m), as well as various modifications of those algorithms. According to the GOSSIP1 algorithm, nodes may forward a route information message (e.g., RREQ message) to the first k hops with a probability p=1 (100%), and thereafter may forward the route information message with a probability p<1. Similar to GOSSIP1, according to the GOSSIP2 algorithm, nodes may forward a route information message (e.g., RREQ message) to the first k hops with a probability p=1 (100%), and thereafter may forward the route information message with a probability $p_1$<1. In GOSSIP2, however, after the first k hops, a node that has fewer than n neighboring nodes may forward the route information message with a probability $p_2$>$p_1$, instead of $p_1$. GOSSIP3 is also similar to GOSSIP1. In GOSSIP3, however, after the first k hops, a node that receives a route information message and initially decides to not forward the message (probability 1−p), may indeed forward the message when the node fails to receive at least m copies of the message (from at least m other nodes) after first receiving the message.

In one example of a modification of one of the aforementioned gossip algorithms, consider the algorithm GOSSIP2a ($p_1$, k, $p_2$, $p_3$, n). GOSSIP2a is similar to GOSSIP2 but adds a third probability $p_3$ according to which to forward a message, where $p_3$ depends on the number of neighboring nodes. In GOSSIP2a, after the first k hops, a node that has greater than n neighboring nodes may forward the route information message with a probability $p_1$, a node that has fewer than (n−n/2) neighboring nodes may forward the route information message with a probability $p_2$>$p_1$, and a node that has between (n−n/2) and n neighboring nodes may forward the route information message with a probability $p_3$.

Quorum System

In addition to implementing a gossip algorithm, the ad-hoc network 103 of example embodiments of the present invention may implement a quorum system in which a number of servers 150 or other network nodes serve as super-nodes (or also referred to as quorum servers). Generally, given a set of elements U, a quorum system Q is a collection of subsets of U. Consider a set of servers that may be divided in a certain number of subsets named quorums. The intersection between any pair of quorums is always non-null. That is, any pair of quorums includes at least one common server.

According to the quorum system of example embodiments of the present invention, a shared data source may be stored in a set of servers 150 of the ad-hoc network 103, from which client nodes (mobile terminals 101) of the ad-hoc network may read and write data. A quorum may be considered a subset of servers of the network. The quorum system of example embodiments permits implementation of read and write operations in only one quorum of servers. The intersection property of quorums (pairs of quorums including at least one common server) may ensure that each reader (node reading data) has access to the most recent data. The quorum system of example embodiments may account for situations in which at least some of the servers of a quorum may fail and, even in this situation, the other servers of the quorum may continue to work and exchange data.

The quorum system of example embodiments of the present invention may include an arbitrary number of client nodes (mobile terminals 101) and a set S of a number of servers 150. There is a quorum system Q when:

$$Q = Q_r + Q_w$$

where $Q_r$ is a set of quorums used for read operations (read quorums), and $Q_w$ is a set of quorums used for write operations (write quorums). Any read quorum and write quorum pair have a non-null intersection including at least one common server.

To write data to the server 150 of a quorum, a client node (mobile terminal 101) may query the servers of the read quorum to choose a timestamp that is higher than those that exist for corresponding data already saved on the servers. The client node may then send the data and a new timestamp to the servers of a write quorum. To read data, a client node may query the servers of a read quorum to locate the latest data as identified by its higher timestamp, which at least one of the respective servers returns to the client node.

Power-Saving Algorithm

Even further, in addition to the gossip algorithm and quorum system, the ad-hoc network 103 of example embodiments of the present invention may implement a power-saving algorithm that directs nodes of the ad-hoc network into a sleep or power-saving mode in instances in which the respective nodes are not involved with routing or data exchange. The power-saving algorithm of example embodiments may be implemented in two phases. The first phase may include the association of a node (mobile terminal 101) to the quorum system. The second phase may include the management of power-saving operations of the node. These power-saving operations may include directing the node into a sleep or power-saving mode, and directing the node to awake from sleep or exit the power-saving mode. And the management of the power-saving operations may be based on determinations of nodes receiving data, whether as a destination or intermediate routing node, where the determinations may be made from the data or determinations of new routes between the nodes.

Figure 3:
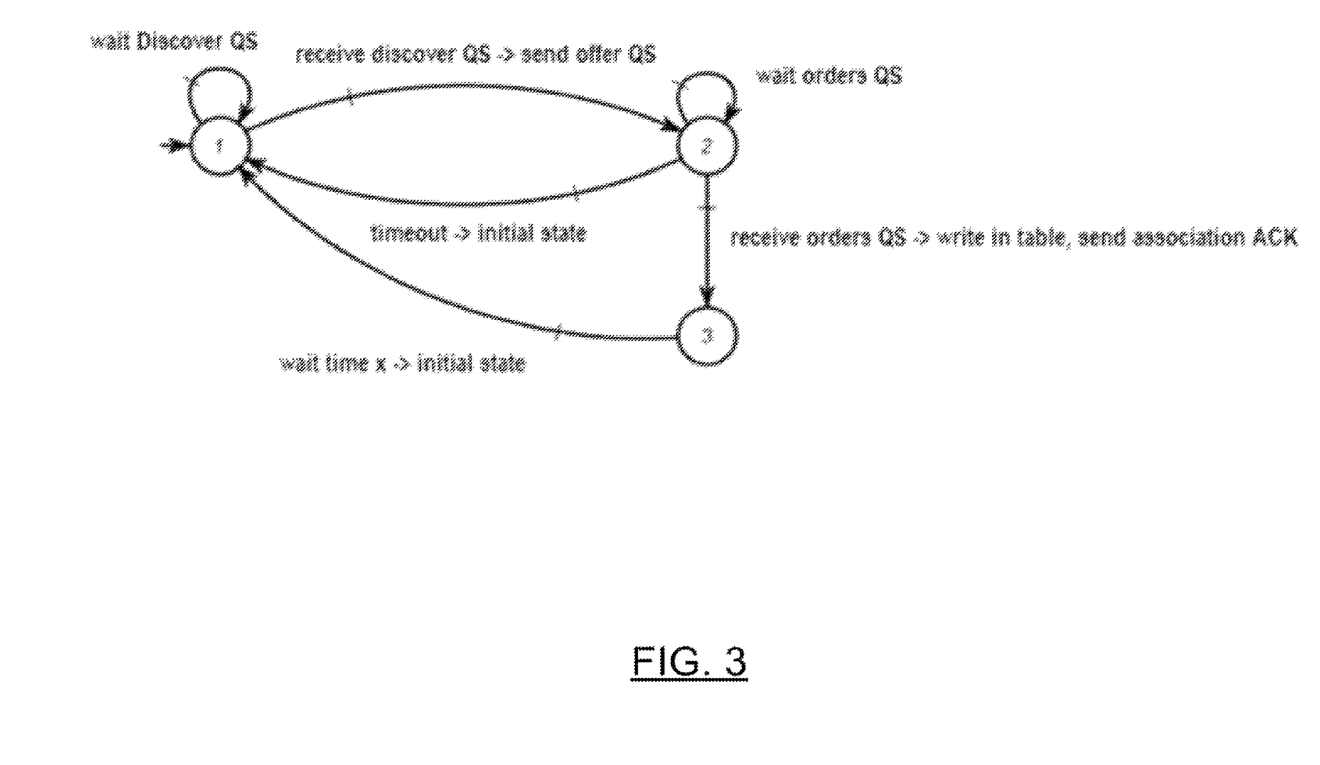
FIGS. 3-6 are state diagrams of components of the communication environment of FIG. 1, according to example embodiments of the present invention.
Figure 4:
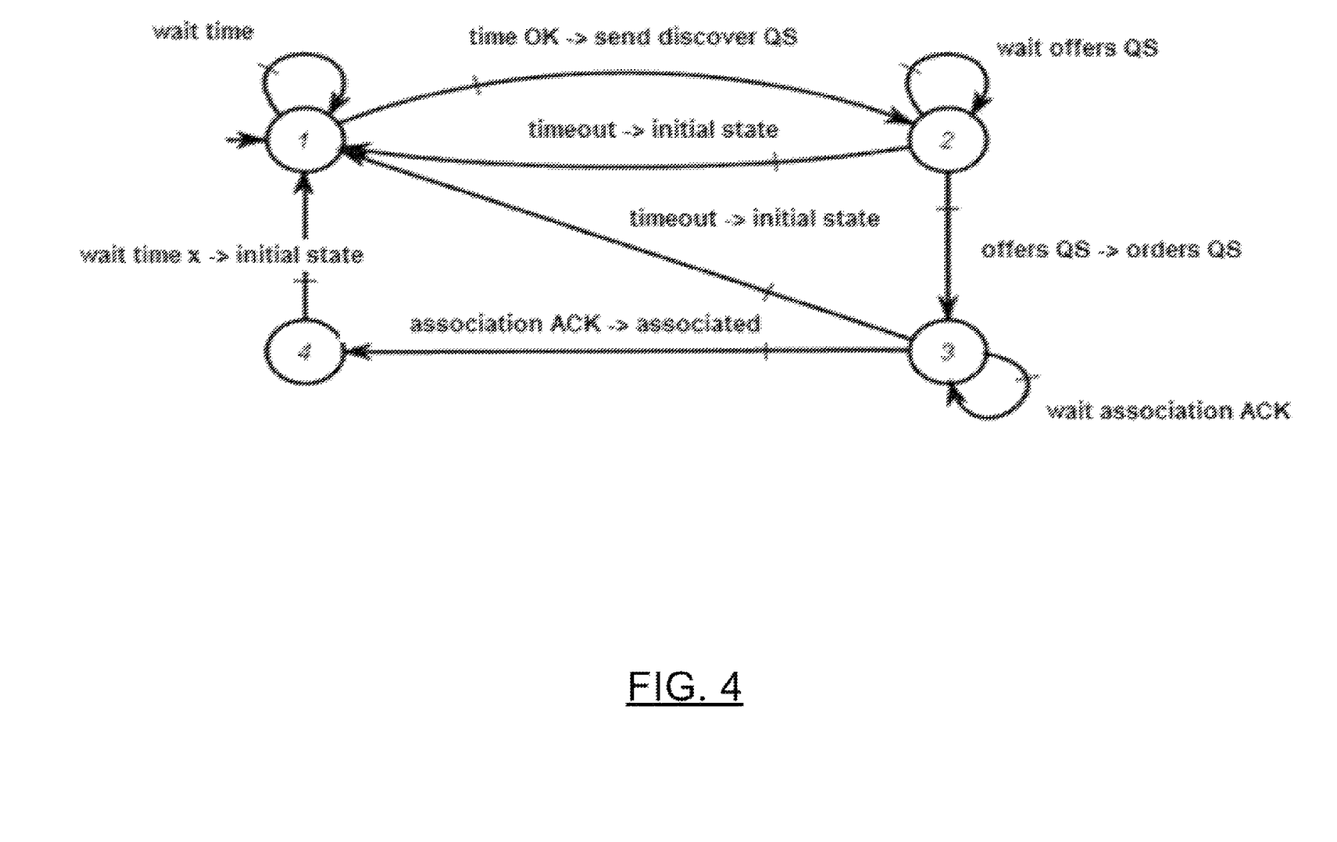

The first phase of the power-saving algorithm of example embodiments of the present invention is shown in the state diagrams of FIGS. 3 and 4 from the perspective of a quorum server 150 and node (mobile terminal 101), respectively. Similarly, the second phase of the power-saving algorithm of example embodiments of the present invention is shown in the state diagrams of FIGS. 5 and 6 from the perspective of the quorum server 150 and node (mobile terminal 101), respectively.

Power-Saving Algorithm: Phase 1

As shown in FIG. 3, in an initial state 1, a quorum server 150 waits for an association request message from a node (mobile terminal 101), an event shown for example as "wait discover QS." Initially, none of the nodes of the ad-hoc network 103 may be associated with any of the quorum servers, and each node may discover and request to associate with one of the quorum servers.

After receiving an association request message (shown as "discover QS") from a node, the quorum server 150 responds with a reply message (shown as "offers QS") indicating that the node may associate with the respective quorum server. The quorum server then transitions to state 2 where the quorum server waits for an association acceptance message from the node, an event shown for example as "wait orders QS." The quorum server may wait for an association acceptance message (shown as "orders QS") in state 2 for a period of time, which upon timing out without the quorum server receiving the message, may direct the quorum server to return to state 1. This timeout may be selected in a number of different manners, such as based on a measured or estimated times of arrival of the messages between the quorum server and node. For example, a timeout of 135 ms may be selected based on the sum of the times of arrival of the respective messages, taking into consideration that a maximum arrival of each message may be 40 ms. The timeout may therefore occur due to loss of the association acceptance message, but may also occur when the time arrives to reassociate the quorum server with nodes of the ad-hoc network.

In instances in which the quorum server 150 receives an association acceptance message, the quorum server writes in a table (e.g., ACTIVE_NODES) that the node is associated with the respective quorum server, and sends an acknowledgement message (ACK) back to the respective node. As explained below, the table may later be used by the quorum server to determine which nodes to direct into and/or out of their power-saving mode.

After writing to the table and sending the acknowledgement message back to the node, the quorum server 150 enters state 3, in which the quorum server remains for a predetermined period of time (e.g., 51 seconds). Following the predetermined period of time, the quorum server returns to state 1. By returning to state 1, the quorum server may reassociate itself with the ad-hoc network nodes, which may be particularly beneficial to move the association of a node with different quorum servers in a mobility scenario in which the quorum server with which a node associates is selected based on the location of the node. It should be noted, then, that a node may exchange messages before the "orders QS," and more than one quorum server may exchange one or more of the messages with a node before the node sends an association acceptance message (e.g., "discover QS," "offers QS") to one of the quorum servers. In these instances, the node may select one of the quorum servers to which to send the association acceptance message, such as by selecting the quorum server located closest to the node.

FIG. 4 illustrates a state diagram of the first phase of the power-saving algorithm, from the perspective of a node (mobile terminal 101). In an initial state 1, the node waits a given period of time (e.g., 5 ms), during which the location (e.g., x, y, z coordinates) of the node may be verified. The location of each of one or more quorum server(s) may also be determined, such as by the node based on beacon(s) from the quorum server(s) (periodic signals with identifying information or position of the transmitter). The location of the node and quorum server(s) may be used, for example, to select a quorum server based on the respective locations, such as by selecting a quorum server closest to the node.

After waiting the given period of time, the node transitions to state 2 during which the node sends an association request message (shown as "discover QS") to one or more quorum servers 150, to discover with which one of the servers the node should associate. In state 2, the node waits for a reply message from the quorum server(s), an event shown for example as "wait offers QS." The node receives a reply message (shown as "offers QS") from the quorum server(s). The node selects one of the quorum server(s) with which to associate, such as based on the location of the node and the quorum server(s), and sends an association acceptance message (shown as "orders QS") to the selected quorum server.

The node moves to state 3, where the node waits for a return acknowledgement (ACK) from the selected quorum server (shown as "wait association ACK). As indicated above, during this time, the selected quorum server may write in a table (e.g., ACTIVE_NODES) that the node is associated with the respective quorum server. Sometime thereafter, the node receives the return acknowledgement from the quorum server, and enters state 4. Similar to the quorum server 150, in state 3, the node may remain in state 4 for a predetermined period of time (e.g., 51 seconds), following which the node returns to its state 1 and reassociates with the same or another quorum server. Also similar to the quorum server, the node at state 2 and/or state 3 may implement a timeout for receipt of a reply message ("offers QS") and/or acknowledgement, respectively. When the node fails to receive the appropriate message(s) within the timeout, the node may return to its state 1. In one example, the timeout for state 2 may be set to 95 ms, and the timeout for state 3 may be set to 180 ms.

Power-Saving Algorithm: Phase 2

Figure 5:
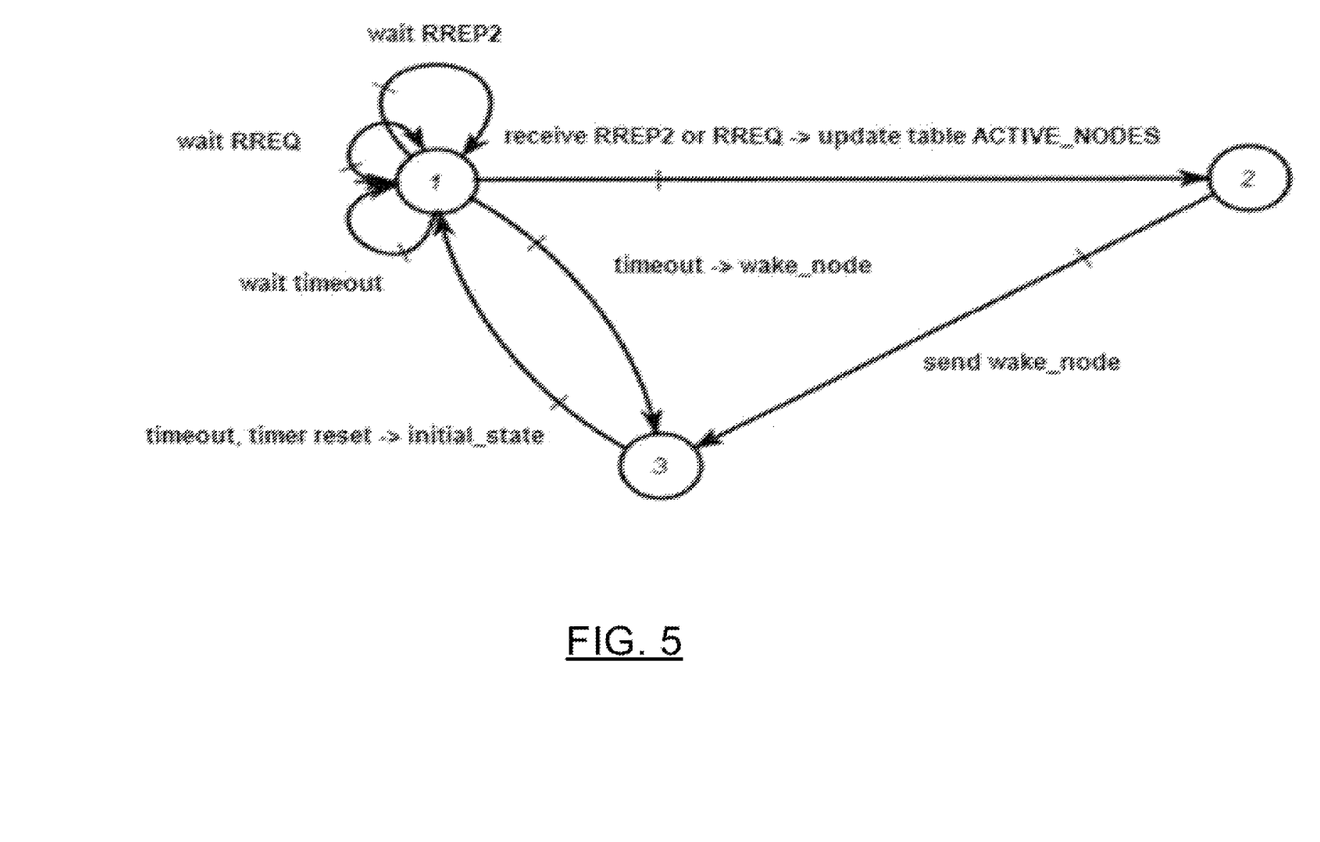

After the first phase of the power-saving algorithm in which a node (mobile terminal 101) associates or reassociates with a quorum server 150, the power-saving algorithm may proceed to the second phase in which the quorum server may manage the power-saving operations of the node. FIG. 5 illustrates a state diagram of the second phase of the power-saving algorithm, from the perspective of a quorum server 150. The second phase of the power-saving algorithm may occur as the nodes of the ad-hoc network 103 exchange route information messages to implement a routing protocol, or as the nodes exchange data messages along route(s) determined during implementation of the routing protocol.

In state 1 of the second phase, the quorum server 150 waits for a route information message from a node. This route information message may include, for example, a RREQ message or RREP message. The route information message may also include, for example, a duplication of a RREQ or RREP message generated, for example, by a node that has received the respective message (a RREP duplication being shown as RREP2, with the original message being shown as RREP1). In this regard, the nodes may be configured such that, during implementation of the appropriate routing protocol, the nodes broadcast or otherwise transmit route information messages not only to or between themselves, but also to the quorum servers.

Route information messages may indicate or otherwise provide sufficient information from which the quorum server may determine one or more nodes intended to also receive the route information message during implementation of the routing protocol to determine a route, and/or one or more nodes intended to otherwise be part of a determined route. These nodes are ones that should remain in an active mode. Other nodes, however, may enter a power-saving mode without significant if any drawback to network performance. Thus, on receipt of a route information message, a quorum server 150 may identify, from its associated nodes, one or more active nodes as those nodes intended to receive the route information message or intended to be part of a determined route. The quorum server may update the table of the quorum server's associated nodes to indicate the active node(s), and enter state 2.

In state 2, for example, the quorum server 150 may send the active node(s) a message (shown as "wake_node") to instruct the active node(s) to enter or remain in an active mode. Alternatively, for example, the quorum server may send a message to its associated nodes other than the active node(s) to instruct those other node(s) to enter or remain in a power-saving mode. In the first example, the other node(s) may receive a message to instruct the respective nodes to enter or remain in the power-saving mode, or the other node(s) may enter or remain in the power-saving mode in the absence of receiving an appropriate message from the quorum server within a predetermined timeout period of time. Similarly, in the second example, the active node(s) may receive a message to instruct the respective nodes to enter or remain in the active mode, or the active node(s) may enter or remain in the active mode in the absence of receiving an appropriate message from the quorum server within a predetermined timeout period of time.

Regardless of the exact manner by which the quorum server 150 instructs its associated nodes in state 2, the quorum server may thereafter enter state 3. The quorum server may then remain in state 3 for a period of time, which upon timing out, may direct the quorum server to return to state 1. This timeout may, for example, be set at 105 ms. Back in state 1, the quorum server may again wait for a route information message from a node. In one example, though, the quorum server may wait a period of time in state 1, which upon timing out without the quorum server receiving a route information message, may direct the quorum server to again instruct its associated nodes in the appropriate modes and return back to state 3. This timeout from state 1 to state 3 may, for example, be set at 95 ms. The timeouts from state 3 to state 1, and from state 1 to state 3, may be set in a number of different manners, such as based on a maximum time for a node to remain awake or asleep, respectively, without affecting parameters such as latency, packet loss and throughput.

Figure 6:
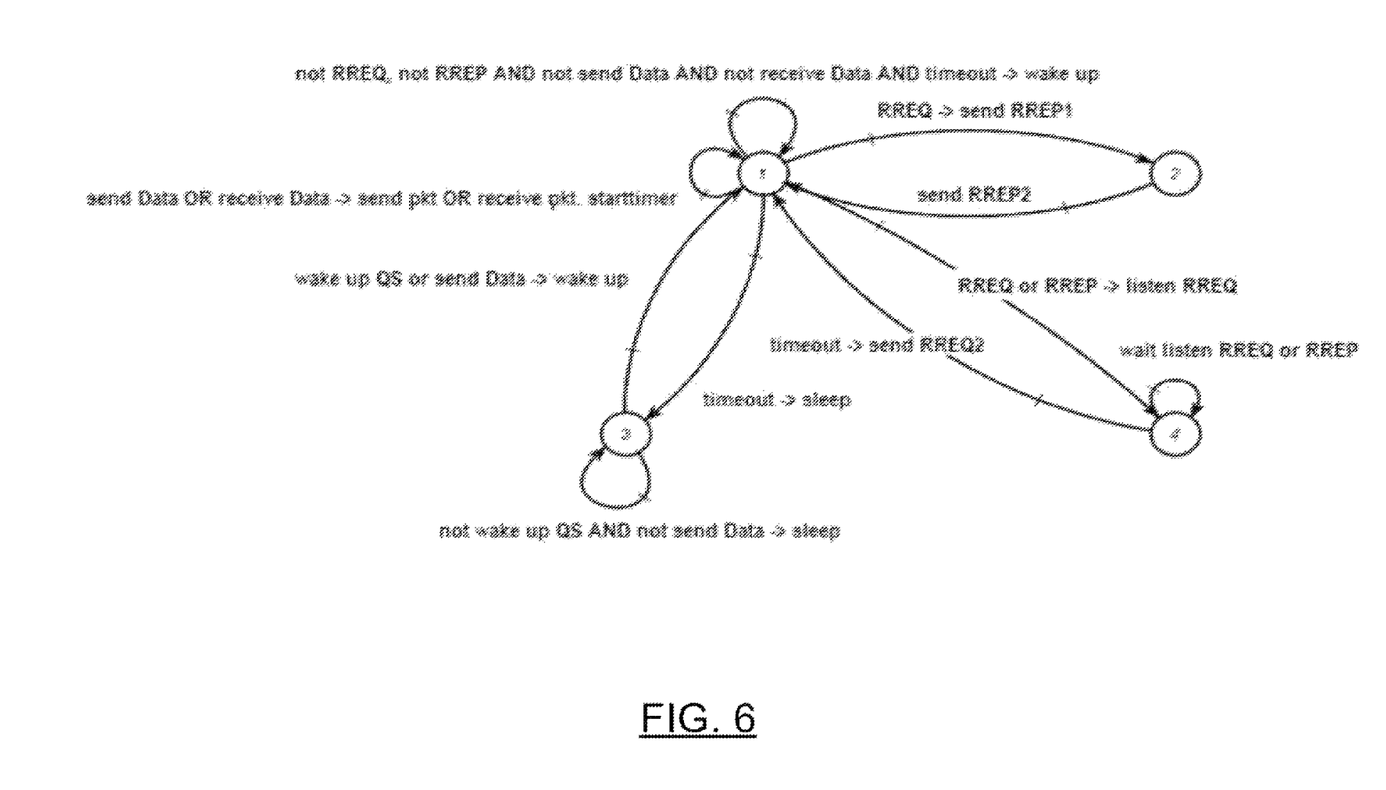

FIG. 6 illustrates a state diagram of the second phase of the power-saving algorithm, from the perspective of a node (mobile terminal 101). In an initial state 1, the node may be in an active mode and wait for receipt of a route information message or data message, or direction to send a route information message or data message such as from a user or software operating on the node. The node may wait for receipt of or direction to send a route information message or data message for a period of time, which upon timing out without the node receiving such a message or direction, may direct the node to enter a power-saving mode and proceed to state 3. This timeout may, for example, be set at 105 ms. If the node receives the appropriate message or direction within the timeout period of time, however, the node may proceed to state 2 or state 4 and initiate another timeout period (e.g., 500 ms) that permits time for a route information message to spread or for the node to transmit or receive data.

In state 3, the node may be in the power-saving mode and wait for receipt of a trigger to exit the power-saving mode and enter the active mode. This trigger may be, for example, direction to send a route information message or data message to another node, such as from a user or software operating on the node. In another example, as explained above, the trigger may be a message ("wake_node") from the node's associated quorum server 150 to instruct the active node(s) to enter or remain in an active mode. As indicated above, this message from the quorum server may be the result of the quorum server determining that the node is intended to receive a route information message, or intended to otherwise be part of a route between nodes. In response to the trigger, the node may enter the active mode, and return to state 1.

In state 1, when the node receives a route information message, the node may reply in the appropriate manner. For example, on receipt of a RREQ message, the node may rebroadcast the RREQ message to its neighboring nodes or send an appropriate RREP message back through the route by which the node received the RREQ message. The node may also send its reply (RREQ or RREP) to the quorum server 150 to which the node is associated. In one particular example, the node may send its reply and generate a duplication of the reply for transmission to its quorum server. This is shown for example in FIG. 6 in which RREP1 represents an original reply to an appropriate RREQ message, and RREP2 represents a duplication of RREP2.

In state 4, if a RREQ is lost, another RREQ may be generated after a period of time (e.g., 330 ms). When a source node desires a route to a destination node, the source node may initiate a route discovery process including the broadcasting and rebroadcasting of RREQ messages by the network nodes, and awaiting a RREP at the source node. An intermediate node receiving the RREQ may first set up a reverse path to the source node that designates the previous hop of the RREQ as the gateway to the respective intermediate node. If the intermediate node has a valid route to the destination, the intermediate node may generate a RREP to the source node and a gratuitous RREP to the destination node; otherwise the intermediate node may rebroadcast the RREQ. Various ones of the nodes may receive duplicate copies of a RREQ from their neighbors, and these duplicate copies may be discarded.

Figure 7:
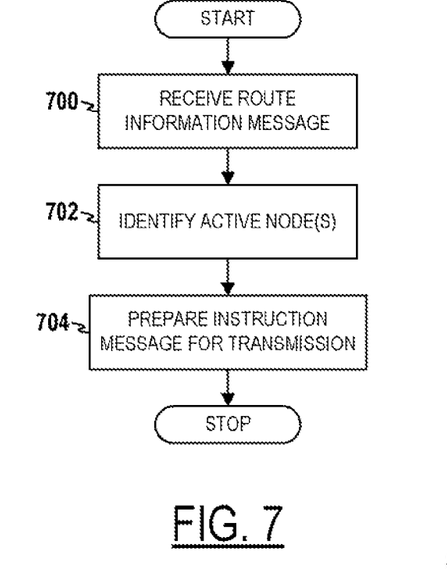
FIGS. 7 and 8 are flowcharts illustrating various operations in the methods of example embodiments of the present invention.
Figure 8:
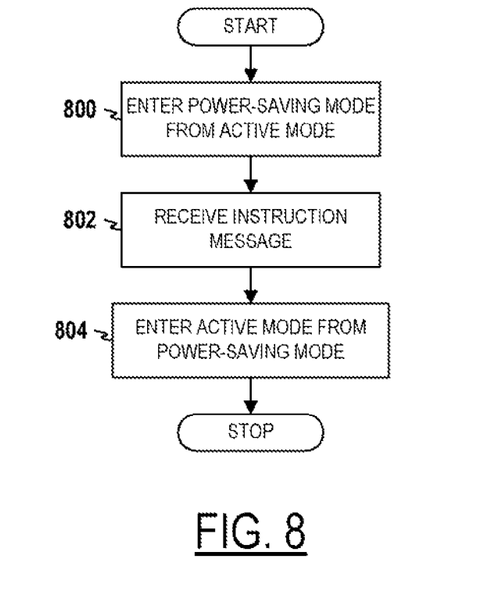

Reference is now made to FIGS. 7 and 8, which illustrate various operations in methods according to example embodiments of the present invention. As shown in FIG. 7, for example, the method of one example embodiment may be performed by a quorum server 150 and may include receiving a route information message or duplication of the route information message from a node (e.g., mobile terminal 101) of an ad hoc network 103 including a plurality of nodes, as shown in block 700. The respective node from which the route information message is received may have sent or received the route information message during implementation of a routing protocol to determine a route between the nodes. The method may also include identifying, based on the route information message, one or more of the nodes (active nodes) intended to also receive the route information message or intended to be part of the determined route, as shown in block 702. And the method may include preparing an instruction message for transmission to one or more of the nodes such that the identified one or more nodes enter or remain in an active mode, and the nodes other than the identified one or more of the nodes enter or remain in a power-saving mode, as shown in block 704.

As shown in FIG. 8, for example, the method of another example embodiment may be performed by a first node (e.g., mobile terminal 101) of an ad hoc network and may include entering the first node in a power-saving mode from an active mode, as shown in block 800. The method may also include receiving an instruction message from a server, as shown in block 802. Similar to the manner described above, the server in this example embodiment may have received a route information message or duplication of the route information message from a node having sent or received the route information message during implementation of a routing protocol to determine a route between the nodes. The server may also have identified, based on the route information message, one or more of the nodes including the first node intended to also receive the route information message or intended to be part of the determined route; and the server may have sent the instruction message to the identified one or more of the nodes including the first node. The method, then, may further include entering the first node in the active mode from the power-saving mode in response to receiving the instruction message, as shown in block 804.

According to one aspect of the example embodiments of present invention, the functions performed by the apparatus 200, such as those illustrated by the state diagrams and flowcharts of FIGS. 3-8, may be performed by various means. It will be understood that each block or operation of the state diagrams and flowcharts, and/or combinations of blocks or operations in the state diagrams and flowcharts, can be implemented by various means. Means for implementing the blocks or operations of the state diagrams and flowcharts, combinations of the blocks or operations in the state diagrams and flowcharts, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 220 of the example apparatus, and executed by a processor, such as the processor 210 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the state diagrams and flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the state diagrams and flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the state diagrams and flowcharts' block(s) or operation(s).

Accordingly, execution of instructions associated with the blocks or operations of the state diagrams and flowcharts by a processor, or storage of instructions associated with the blocks or operations of the state diagrams and flowcharts in a computer-readable storage medium, supports combinations of operations for performing the specified functions. It will also be understood that one or more blocks or operations of the state diagrams and flowcharts, and combinations of blocks or operations in the state diagrams and flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
the at least one memory and the computer program code configured to, with the at least one processor, cause the apparatus to at least:
receive a route information message or duplication of the route information message from a node of an ad hoc network including a plurality of nodes, the node having previously sent or received the route information message during implementation of a routing protocol to determine a route between the nodes;
identify, based on the route information message, one or more of the nodes intended to also receive the route information message or intended to be part of the determined route; and
prepare an instruction message for transmission to one or more of the nodes such that the identified one or more nodes enter or remain in an active mode, and the nodes other than the identified one or more of the nodes enter or remain in a power-saving mode in response to receiving the instruction message, wherein the one or more nodes are configured to enter or remain in the active mode or the power saving mode in response to an absence of receiving the instruction message within a predetermined period.

2. The apparatus of claim 1, wherein being configured to cause the apparatus to receive a route information message or duplication of the route information message includes being configured to cause the apparatus to receive a route information message or duplication of the route information message from a node having sent or received the route information message during implementation of a routing protocol according to a gossip algorithm.

3. The apparatus of claim 1, wherein the apparatus is embodied by a quorum server of a plurality of quorum servers configured to implement a quorum system within the ad hoc network.

4. The apparatus of claim 1, wherein the at least one memory and the computer program code are further configured to, with the at least one processor, cause the apparatus to further:
wait a period of time after preparing the instruction message to receive a second route information message; and
in an instance in which the second route information message is not received within the period of time,
prepare a second instruction message for transmission to the one or more of the nodes such that the identified one or more nodes remain in the active mode, and the nodes other than the identified one or more of the nodes remain in the power-saving mode.

5. The apparatus of claim 1, wherein the at least one memory and the computer program code are further configured to, with the at least one processor, cause the apparatus to further:
participate in an association of one or more of the nodes with the apparatus,
wherein being configured to cause the apparatus to receive a route information message or duplication of the route information message includes being configured to cause the apparatus to receive a route information message or duplication of the route information message from an associated node, being configured to cause the apparatus to identify one or more of the nodes includes being configured to cause the apparatus to identify one or more of the associated nodes, and being configured to cause the apparatus to prepare an instruction message for transmission includes being configured to cause the apparatus to prepare an instruction message for transmission to one or more of the associated nodes.

6. An apparatus comprising:
at least one processor; and
at least one memory including computer program code,
the at least one memory and the computer program code configured to, with the at least one processor, cause the apparatus to at least:
enter the apparatus in a power-saving mode from an active mode, the apparatus being one of a plurality of nodes of an ad hoc network;
receive an instruction message from a server,
wherein the server has received a route information message or duplication of the route information message from a node having sent or received the route information message during implementation of a routing protocol to determine a route between the nodes,
wherein the server has also identified, based on the route information message previously received, one or more of the nodes including the apparatus intended to also receive the route information message or intended to be part of the determined route, and
wherein the server has sent the instruction message to the one or more of the nodes including the apparatus that were previously identified; and
enter the apparatus in the active mode from the power-saving mode in response to receiving the instruction message, wherein the apparatus is configured to enter or remain in the active mode in response to an absence of receiving the instruction message within a predetermined period.

7. The apparatus of claim 6, wherein being configured to cause the apparatus to receive an instruction message includes being configured to cause the apparatus to receive an instruction message from a server having received a route information message or duplication of the route information message from a node having sent or received the route information message during implementation of a routing protocol according to a gossip algorithm.

8. The apparatus of claim 6, wherein being configured to cause the apparatus to receive an instruction message includes being configured to cause the apparatus to receive an instruction message from a quorum server of a plurality of quorum servers configured to implement a quorum system within the ad hoc network.

9. The apparatus of claim 6, wherein the at least one memory and the computer program code are further configured to, with the at least one processor, cause the apparatus to further:
direct operation of the apparatus in the active mode; and
wait a period of time to receive a route information message or data message, or receive direction to send a route information message or data message,
wherein being configured to cause the apparatus to enter the apparatus in a power-saving mode includes being configured to cause the apparatus to enter the apparatus in a power-saving mode in an instance in which the route information message or data message, or direction to send the route information message or data message, is not received within the period of time.

10. The apparatus of claim 6, wherein receiving an instruction message includes receiving an instruction message from a server having received a first route information message or duplication of the first route information message, and wherein the at least one memory and the computer program code are further configured to, with the at least one processor, cause the apparatus to further:
prepare a second route information message for transmission to one or more other nodes during implementation of the routing protocol; and
prepare the second route information message or duplication of the second route information message for transmission to the server, thereby enabling the server to identify, based on the route information message, one or more of the nodes intended to also receive the second route information message or intended to be part of the determined route, and enabling the server to send an instruction message to the identified one or more of the nodes to instruct the respective one or more nodes to enter or remain in the active mode.

11. The apparatus of claim 10, wherein being configured to cause the apparatus to prepare the second route information message for transmission to the server includes being configured to cause the apparatus to generate a duplication of the second route information message, and prepare the duplication of the second route information message for transmission to the server.

12. A method comprising:
receiving a route information message or duplication of the route information message from a node of an ad hoc network including a plurality of nodes, the node having previously sent or received the route information message during implementation of a routing protocol to determine a route between the nodes;
identifying, based on the route information message, one or more of the nodes intended to also receive the route information message or intended to be part of the determined route; and
preparing an instruction message for transmission to one or more of the nodes such that the identified one or more nodes enter or remain in an active mode, and the nodes other than the identified one or more of the nodes enter or remain in a power-saving mode in response to receiving the instruction message, wherein the one or more nodes are configured to enter or remain in the active mode or the power saving mode in response to an absence of receiving the instruction message within a predetermined period.

13. The method of claim 12, wherein receiving a route information message or duplication of the route information message includes receiving a route information message or duplication of the route information message from a node having sent or received the route information message during implementation of a routing protocol according to a gossip algorithm.

14. The method of claim 12, wherein receiving a route information message or duplication of the route information message, identifying one or more of the nodes, and preparing a message for transmission are performed by a quorum server of a plurality of quorum servers configured to implement a quorum system within the ad hoc network.

15. The method of claim 12 further comprising:
waiting a period of time after preparing the instruction message to receive a second route information message; and in an instance in which the second route information message is not received within the period of time,
preparing a second instruction message for transmission to the one or more of the nodes such that the identified one or more nodes remain in the active mode, and the nodes other than the identified one or more of the nodes remain in the power-saving mode.

16. The method of claim 12, wherein receiving a route information message or duplication of the route information message, identifying one or more of the nodes, and preparing a message for transmission are performed by a server, and wherein the method further comprises:
participating in an association of one or more of the nodes with the respective server,
wherein receiving a route information message or duplication of the route information message includes receiving a route information message or duplication of the route information message from an associated node, identifying one or more of the nodes includes identifying one or more of the associated nodes, and preparing an instruction message for transmission includes preparing an instruction message for transmission to one or more of the associated nodes.

17. A method comprising:
entering a first node in a power-saving mode from an active mode, the first node being one of a plurality of nodes of an ad hoc network;
receiving an instruction message from a server,
wherein the server has received a route information message or duplication of the route information message from a node having sent or received the route information message during implementation of a routing protocol to determine a route between the nodes,
wherein the server has also identified, based on the route information message previously received, one or more of the nodes including the first node intended to also receive the route information message or intended to be part of the determined route, and
wherein the server has sent the instruction message to the one or more of the nodes including the first node that were previously identified; and
entering the first node in the active mode from the power-saving mode in response to receiving the instruction message, wherein the apparatus is configured to enter or remain in the active mode in response to an absence of receiving the instruction message within a predetermined period.

18. The method of claim 17, wherein receiving an instruction message includes receiving an instruction message from a server having received a route information message or duplication of the route information message from a node having sent or received the route information message during implementation of a routing protocol according to a gossip algorithm.

19. The method of claim 17, wherein receiving an instruction message includes receiving an instruction message from quorum server of a plurality of quorum servers configured to implement a quorum system within the ad hoc network.

20. The method of claim 17 further comprising:
directing operation of the first node in the active mode; and
waiting a period of time to receive a route information message or data message, or receive direction to send a route information message or data message,
wherein entering a first node in a power-saving mode includes entering the first node in a power-saving mode in an instance in which the route information message or data message, or direction to send the route information message or data message, is not received within the period of time.

21. The method of claim 17, wherein receiving an instruction message includes receiving an instruction message from a server having received a first route information message or duplication of the first route information message, and wherein the method further comprises:

preparing a second route information message for transmission from the first node to one or more other nodes during implementation of the routing protocol; and preparing the second route information message or duplication of the second route information message for transmission from the first node to the server, thereby enabling the server to identify, based on the route information message, one or more of the nodes intended to also receive the second route information message or intended to be part of the determined route, and enabling the server to send an instruction message to the identified one or more of the nodes to instruct the respective one or more nodes to enter or remain in the active mode.

22. The method of claim 21, wherein preparing the second route information message for transmission to the server includes generating a duplication of the second route information message, and preparing the duplication of the second route information message for transmission from the first node to the server.

23. An apparatus comprising:

means for receiving a route information message or duplication of the route information message from a node of an ad hoc network including a plurality of nodes, the node having previously sent or received the route information message during implementation of a routing protocol to determine a route between the nodes;

means for identifying, based on the route information message, one or more of the nodes intended to also receive the route information message or intended to be part of the determined route; and means for preparing an instruction message for transmission to one or more of the nodes such that the identified one or more nodes enter or remain in an active mode, and the nodes other than the identified one or more of the nodes enter or remain in a power-saving mode in response to receiving the instruction message, wherein the one or more nodes are configured to enter or remain in the active mode or the power saving mode in response to an absence of receiving the instruction message within a predetermined period.

24. The apparatus of claim 23, wherein means for receiving a route information message or duplication of the route information message includes means for receiving a route information message or duplication of the route information message from a node having sent or received the route information message during implementation of a routing protocol according to a gossip algorithm.

25. The apparatus of claim 23, wherein the apparatus is embodied by a quorum server of a plurality of quorum servers configured to implement a quorum system within the ad hoc network.

26. The apparatus of claim 23 further comprising:

means for waiting a period of time after preparing the instruction message to receive a second route information message; and in an instance in which the second route information message is not received within the period of time, means for preparing a second instruction message for transmission to the one or more of the nodes such that the identified one or more nodes remain in the active mode, and the nodes other than the identified one or more of the nodes remain in the power-saving mode.

27. The apparatus of claim 23 further comprising:

participating in an association of one or more of the nodes with the apparatus, wherein means for receiving a route information message or duplication of the route information message includes means for receiving a route information message or duplication of the route information message from an associated node, means for identifying one or more of the nodes includes means for identifying one or more of the associated nodes, and means for preparing an instruction message for transmission includes means for preparing an instruction message for transmission to one or more of the associated nodes.

28. A computer-readable storage medium having computer-readable program code portions stored therein, the computer-readable storage medium and computer-readable program code portions being configured to, with at least one processor, cause an apparatus to at least:

receive a route information message or duplication of the route information message from a node of an ad hoc network including a plurality of nodes, the node having previously sent or received the route information message during implementation of a routing protocol to determine a route between the nodes;

identify, based on the route information message, one or more of the nodes intended to also receive the route information message or intended to be part of the determined route; and prepare an instruction message for transmission to one or more of the nodes such that the identified one or more nodes enter or remain in an active mode, and the nodes other than the identified one or more of the nodes enter or remain in a power-saving mode in response to receiving the instruction message, wherein the one or more nodes are configured to enter or remain in the active mode or the power saving mode in response to an absence of receiving the instruction message within a predetermined period.

29. The computer-readable storage medium of claim 28, wherein being configured to cause the apparatus to receive a route information message or duplication of the route information message includes being configured to cause the apparatus to receive a route information message or duplication of the route information message from a node having sent or received the route information message during implementation of a routing protocol according to a gossip algorithm.

30. The computer-readable storage medium of claim 28, wherein the apparatus is embodied by a quorum server of a plurality of quorum servers configured to implement a quorum system within the ad hoc network.

31. The computer-readable storage medium of claim 28, wherein the computer-readable storage medium and computer-readable program code portions are further configured to, with the at least one processor, cause the apparatus to further:

wait a period of time after preparing the instruction message to receive a second route information message; and in an instance in which the second route information message is not received within the period of time, prepare a second instruction message for transmission to the one or more of the nodes such that the identified one or more nodes remain in the active mode, and the nodes other than the identified one or more of the nodes remain in the power-saving mode.

32. The computer-readable storage medium of claim 28, wherein the computer-readable storage medium and computer-readable program code portions are further configured to, with the at least one processor, cause the apparatus to further:

participate in an association of one or more of the nodes with the apparatus, wherein being configured to cause the apparatus to receive a route information message or duplication of the route information message includes being configured to cause the apparatus to receive a route information message or duplication of the route information message from an associated node, being configured to cause the apparatus to identify one or more of the nodes includes being configured to cause the apparatus to identify one or more of the associated nodes, and being configured to cause the apparatus to prepare an instruction message for transmission includes being configured to cause the apparatus to prepare an instruction message for transmission to one or more of the associated nodes.

* * * * *